United States Patent
Lewis (10) Patent No.: US 10,901,821 B2
(45) Date of Patent: Jan. 26, 2021

(54) SYSTEM AND METHOD FOR SENDING RESTFUL COMMANDS TO UEFI FIRMWARE USING UEFI VARIABLE SERVICES

(71) Applicant: Insyde Software Corp., Taipei (TW)

(72) Inventor: Timothy Andrew Lewis, El Dorado Hills, CA (US)

(73) Assignee: Insyde Software Corp., Taipei (TW)

( * ) Notice: Subject to any disclaimer, the term of this patent is extended or adjusted under 35 U.S.C. 154(b) by 0 days.

(21) Appl. No.: 16/176,346

(22) Filed: Oct. 31, 2018

(65) Prior Publication Data

US 2019/0138377 A1    May 9, 2019

Related U.S. Application Data

(60) Provisional application No. 62/579,839, filed on Oct. 31, 2017.

(51) Int. Cl.
| | | |
|---|---|---|
| *G06F 3/00* | (2006.01) | |
| *G06F 9/54* | (2006.01) | |
| *G06F 21/57* | (2013.01) | |
| *G06F 21/31* | (2013.01) | |

(52) U.S. Cl.
CPC ............ *G06F 9/547* (2013.01); *G06F 21/572* (2013.01); *G06F 21/31* (2013.01)

(58) Field of Classification Search
CPC ..................................... G06F 9/54; G05F 9/54
USPC ........................................................ 719/310
See application file for complete search history.

(56) References Cited

U.S. PATENT DOCUMENTS

| | | | |
|---|---|---|---|
| 9,298,524 B2 | 3/2016 | Lewis | |
| 9,477,848 B2 | 10/2016 | Nicholes | |
| 9,660,807 B2 | 5/2017 | Lewis | |
| 9,727,390 B1* | 8/2017 | Righi | ...................... G06F 9/545 |
| 2005/0071665 A1* | 3/2005 | Zimmer | ................... G06F 9/441 726/26 |
| 2008/0148031 A1* | 6/2008 | Brown | ................ G06F 9/44505 713/1 |
| 2011/0258188 A1* | 10/2011 | AbdAlmageed | .... G06F 16/7844 707/736 |
| 2012/0072926 A1* | 3/2012 | Woo | ........................ G06F 9/451 719/328 |
| 2016/0147578 A1* | 5/2016 | Biesack | ................... G06F 9/541 719/328 |
| 2018/0336042 A1* | 11/2018 | Rathineswaran | ..... G06F 9/4406 |

OTHER PUBLICATIONS

Fatna Belqasmi, RESTful Web Services for Service Provisioning in Next-Generation Networks: A Survey. (Year: 2011).*
DMTF, System Management Bios (SMBIOS) Reference Specification, Version 3.0.0. Document Identifier: DSP0134, 142 pages, Feb. 12, 2015.
Franks et al., HTTP Authentication: Basic and Digest Access Authentication. Network Working Group. Retrieved online at ietf.org/rfc/rfc2617.txt. 34 pages, Jun. 1999.

(Continued)

*Primary Examiner* — Lechi Truong
(74) *Attorney, Agent, or Firm* — McCarter & English, LLP; John S. Curran (57) ABSTRACT

A system and method for sending RESTful commands to UEFI firmware using UEFI variable services is discussed. Processed RESTful commands return data in a RESTful format.

18 Claims, 4 Drawing Sheets

(56) References Cited

OTHER PUBLICATIONS

IPMI, Intelligent Platform Management Interface Specification, Second Generation, v2.0. Document Revision 1.0, Intel, Hewlett-Packard, NEC, Dell. 590 pages, Feb. 12, 2004.

IPMI, Intelligent Platform Management Interface Specification, Second Generation, v2.0. Document Revision 1.0, Intel, Hewlett-Packard, NEC, Dell. 644 pages, Feb. 12, 2004.-Jun. 12, 2009 Markup.

Redfish, Redfish Scalable Platforms Management API Specification. DMTF, Version 1.0.0. Retrieved online at: https://dmtf.org/sites/default/files/standards/documents/DSP0266_1.0.0.pdf. 70 pages, Aug. 4, 2004.

Uefi, Unified Extensible Interface Specification, Version 2.6. Unified EFI, Inc. 2706 pages, Jan. 2016.

\* cited by examiner

SYSTEM AND METHOD FOR SENDING RESTFUL COMMANDS TO UEFI FIRMWARE USING UEFI VARIABLE SERVICES

RELATED APPLICATION

This application claims the benefit of, and priority to, U.S. Provisional Patent Application No. 62/579,839, filed Oct. 31, 2017, the contents of which are incorporated herein by reference in their entirety.

BACKGROUND

Representational State Transfer (RESTful) web services were developed to provide interoperability between computer systems on the Internet. Restful web services utilize a uniform and predefined set of stateless operations to allow requesting systems to access and manipulate textual representations of web resources. Requests are made to a resource's Uniform Resource Identifier (URI) and responses are provided in a defined format such as XML, HTML, JPEG, PDF, plain text and JavaScript Object Notation (JSON). Requests may be made using HTTP and include operations defined by HTTP operations such as GET, PUT, POST, PATCH and DELETE. Web service APIs that follow REST architectural constraints are referred to as RESTful APIs.

Computing devices are initialized by firmware included within the device and this firmware provides a range of software services which facilitate the boot of the operating system (OS) as well as providing a smaller subset of these services that continue to be available after the operating system has booted. Firmware is software that has been written onto non-volatile Read-Only Memory (ROM) modules including, but not limited to, ROM, PROM, EPROM, EEPROM, and Flash memory (collectively referred to hereafter as "ROM"). A characteristic of non-volatile memory is that it retains data when power is withdrawn. In contrast, volatile memory loses data in the absence of power. For example, volatile Random Access Memory (RAM) loses its data when a computer is shut down while the various types of non-volatile ROM maintain their data through shutdown and re-boot. Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons.

Unified Extensible Firmware Interface (UEFI) is a specification created by a non-profit industry body detailing a programming interface between the Operating System and the included firmware of a computing device such as, but not limited to, a Personal Computer (PC). The UEFI specification describes a set of tools by which a computing device can move in an organized fashion from the power-applied state to fully operational. The specification tells the desired result but deliberately does not specify the internal tactic of implementation. The UEFI firmware specification replaces earlier OS/firmware interfaces previously used by the industry and commonly known as legacy BIOS.

When implemented in a computing device, the machine codes for UEFI firmware and all permanent data used by the firmware reside in Read Only Memory (ROM). In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the system executes a process called reset which clears the state to a known condition and begins execution of the firmware. The firmware is read from the flash ROM or other ROM in the computing device.

The ROM in a computing device may be partitioned into several functional divisions or regions. One such region is the code store which must be protected from alteration by any entity except for entities that have been authorized to update the code store. A second region called the Authenticated Variable Region or Store holds Authenticated Variables defined in the UEFI specification and is used to hold UEFI-defined security information (the security database). In addition to the UEFI-defined information the Authenticated Variable Store can be used to store user-defined data related to the ultimate uses of the computer. Because it contains security data and potentially sensitive user data, the UEFI specification provides that the Authenticated Variable Region/Store must be protected from alteration by any entity except those authorized by the presence of identifying key data within the security database. A third region, the UEFI variable store, contains lower security information which may be freely updated by user programs.

The computing device contains one or more elements known as Central Processing Units (CPU) which, when in operation, can read from and also erase and/or write flash ROM. The CPU has a normal operating mode and a second operating mode called System Management Mode (SMM). When the CPU is in normal operating mode it can access all elements of the computer except certain memory regions exclusively dedicated to SMM mode. In contrast, when the CPU is operating in SMM mode it is able to access all elements of the computing device including the dedicated memory. An electrical signal is made available within the circuitry of the computing device which can indicate when the CPU is operating within SMM. The CPU device may be directed to transition from normal operating mode to SMM by a number of triggers called System Manage Interrupt (SMI) events including SMI events triggered by firmware. The exact triggers available differ somewhat from among system designs but the result when the platform appropriate trigger is used is always that execution in main memory is immediately suspended and execution begins at a specific location in SMM memory.

BRIEF SUMMARY

Embodiments of the present invention use existing firmware UEFI variable services to receive RESTful commands in order to manipulate firmware-managed resources. Using UEFI variable services allows OS-based applications to gain access to firmware services without exposing an additional firmware API. Using RESTful commands provides a well-understood means to enumerate, read, write and operate on firmware-managed resources. In some embodiments, security may be provided with a user-name and password using HTTP Basic security, by using session security or via UEFI variable security.

In one embodiment, a computing device-implemented method for receiving RESTful commands via firmware on the device, includes equating, for each one of a plurality of UEFI variable names respectively associated with a well-known GUID, the UEFI variable name to a RESTful resource managed by the firmware. The method further receives, with the firmware, a UEFI variable service request from an operating system entity via a UEFI variable services interface. The UEFI variable service request includes a variable name associated with a well-known GUID. Additionally, the method also translates, with the firmware, the UEFI variable service request to a RESTFUL command for a RESTful resource based on the variable name, processes the RESTful command and provides, via the firmware, a RESTful response based on the processing of the RESTful command.

In another embodiment a computing device includes at least one processor, an operating system, a Unified Extensible Firmware Interface (UEFI) variable services interface and firmware. The firmware when executed causes the computing device to equate, for each one of multiple UEFI variable names respectively associated with a well-known GUID, the UEFI variable name to a RESTful resource managed by the firmware. The firmware when executed also causes the computing device to receive a UEFI variable service request from an operating system entity via a UEFI variable services interface. The UEFI variable service request includes a variable name associated with a well-known GUID. Additionally, the firmware when executed causes the computing device to translate the UEFI variable service request to a RESTFUL command for a RESTful resource based on the variable name, process the RESTful command, and provide a RESTful response based on the processing of the RESTful command.

BRIEF DESCRIPTION OF THE DRAWINGS

The accompanying drawings, which are incorporated in and constitute a part of this specification, illustrate one or more embodiments of the invention and, together with the description, help to explain the invention. In the drawings:

FIG. 1 (prior art) depicts a conventional sequence for submitting UEFI variable service requests;

FIG. 2 depicts an exemplary system architecture in an exemplary embodiment;

FIG. 3 depicts an exemplary sequence of steps in a computing device to receive RESTful commands for firmware resources in an exemplary embodiment; and FIG. 4 depicts an exemplary computing device suitable for practicing an exemplary embodiment.

DETAILED DESCRIPTION

Embodiments of the present invention provide access by OS-based applications to firmware-managed resources on a computing device equipped with UEFI-compliant firmware. Access is provided without requiring operating system (OS) code changes by making use of the existing UEFI Variable Services interface to implement a RESTful API. Through a firmware-based approach, access to firmware-managed resources can be improved for applications and other software agents executing in the OS environment.

The standard defined UEFI variable services interface has been supported for several years on various operating systems and includes support for a number of firmware service calls including the GetVariable, SetVariable and GetNextVariable firmware service calls. In the case of system management, the use of the variable interface is natural, as one main component of system management is reviewing and modifying system settings.

The firmware on a platform has access to a number of resources and has the ability to manage those resources. Data related to the management of the resources may be stored in UEFI firmware variables. In UEFI firmware-equipped computing devices, access to the firmware-managed resources is provided via UEFI service requests submitted via the UEFI variable services interface. For example, conventionally, an application or other software agent running in the operating system environment that wanted to retrieve a value of a particular firmware variable would make a call to the firmware using GetVariable and provide parameters that include the assigned name of the variable (VariableName), and a unique ID for the scope of the variable (VendorGuid). Other parameters provided by the caller would include the size of the return data buffer on input or the size of the data returned in output (DataSize) and the buffer to which the contents of the variable should be returned (Data). The parameters also might optionally include a memory location to return an attributes bitmask for the variable (Attributes).

Figure 1:
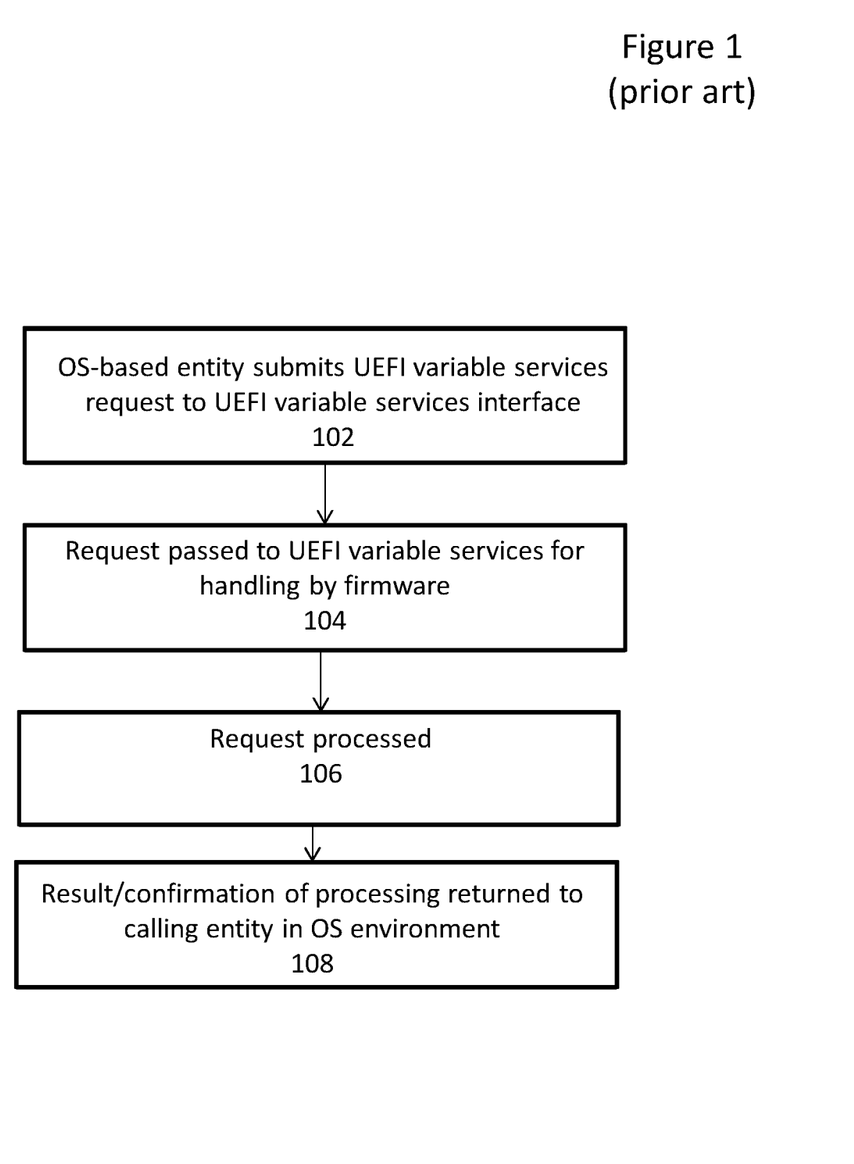

An example of this conventional sequence for submitting UEFI variable service requests is depicted in FIG. 1. An OS-based application submits a GetVariable or other UEFI variable services request to a UEFI variable services interface in the OS environment (step 102). The request is passed to the UEFI variable services firmware for handling (step 104). The request is processed by the firmware (step 106) and a result of the request/confirmation of completion is returned to requesting entity (step 108).

However, operating systems typically limit access to firmware services and are slow to add support for new firmware services with the result that OS-based entities may not have access to needed data. Additionally, while operating systems often know how to parse data that is in a format that meets industry standards, the firmware may not provide data according to such an industry standard. One such industry standard is the Redfish standard, which formats all data as JSON and provides a RESTful interface for manipulating it. Optional approaches to obtaining data from the firmware such as operating system drivers that comprehend platform differences are expensive to write and may not be shipped with the operating system's standard installation. To address these issues with operating system access to firmware-managed resources, embodiments use widely supported UEFI variable firmware services to implement RESTful APIs that can manipulate firmware-managed resources.

Embodiments of the present invention use defined UEFI firmware variable service calls including, but not limited to, GetVariable, SetVariable and GetNextVariable to access and perform system management, diagnostic and other functions via a firmware implemented RESTful API. UEFI firmware variable service requests submitted via the standard defined UEFI firmware variable service calls are translated into RESTful commands handled by the firmware. System management functions include but are not limited to: obtaining detailed inventory and/or platform information, updating firmware, changing firmware settings, and controlling boot of the platform. Diagnostic functions include, but are not limited to: running tests on the platform, querying for test results, querying for platform errors, and setting up tests to run on the next boot. In one embodiment, firmware variable service calls intended to be handled as RESTful commands may include a special GUID value as a parameter so as to avoid conflict with the standard use of the variable interface. The firmware variable services interface utilized by embodiments of the present invention is available during all phases of platform operation, including OS runtime. For example, under recent versions of Windows, the call SetFirmwareEnvironmentVariable( ) is available in the Windows API. In the same way, GetFirmwareEnvironmentVariable( ) is available to read a UEFI variable.

In one embodiment, if a management application running in the operating system environment on the computing device requires low-level system information known to firmware, the management application may use the standard GetVariable variable service call to request the information via a RESTful command. In another embodiment, a system management application that wants to change a setting at the firmware level may use the extended SetVariable variable service call to request firmware to change the setting via a RESTful command. Similarly, in the area of diagnostics, a diagnostic application or other tool executing in the OS environment may require a special test to be performed by the computing device's firmware during the next reboot. The diagnostic tool may request that the firmware perform the test with a request made through the SetVariable variable service call that is translated into a RESTful command.

It should be appreciated that although the descriptions herein of illustrative embodiments of the present invention describe the use of GetVariable, GetNextVariable and SetVariable firmware variable service calls, other firmware variable service calls may also be utilized without departing from the scope of the present invention.

Figure 2:
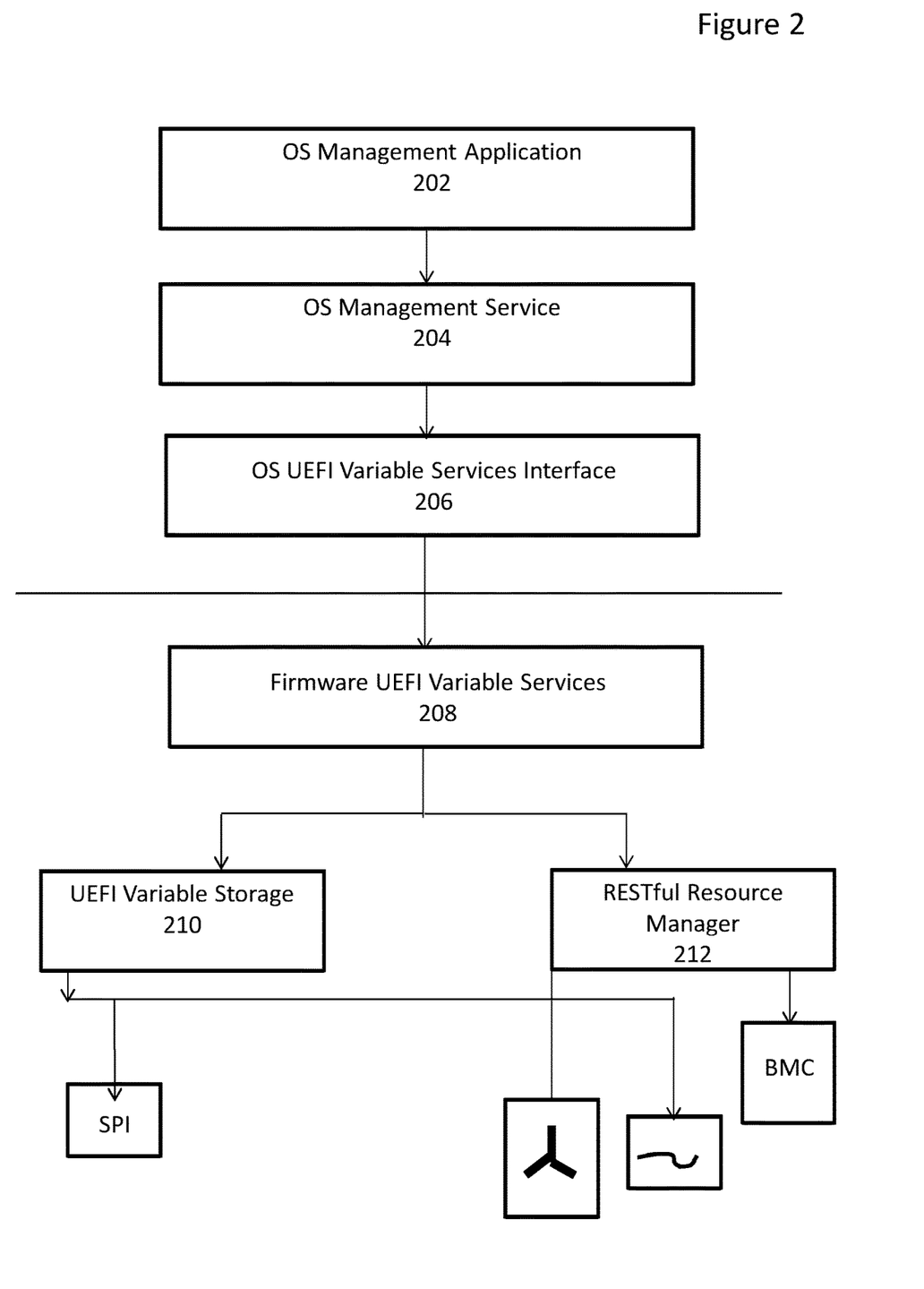

FIG. 2 depicts an exemplary system architecture for a system in an exemplary embodiment. An OS management application 102 and/or OS Management Service 104 requests to access firmware resources via the OS (runtime) UEFI Variables Services Interface 106 which interacts with the firmware UEFI Variable Services 108. The system also includes UEFI Variable Storage 110 and as, described further below, a RESTful Resource Manager 112. In one embodiment, variable service calls that are to be handled as RESTful commands include a predefined GUID as a parameter that indicates special handling is required.

The UEFI Specification provides three standard UEFI variable services: GetVariable, SetVariable and GetNextVariable. The basic form of a variable services request uses the GetVariable and SetVariable API, with the variable name indicating the URI and other headers set to defaults. The extended form uses the GetVariable API with the Verb, URI and other headers in the variable name. These variable services identify each variable by a GUID (VendorGuid) and string (VariableName). Embodiments of the present invention equate each variable name associated with a well-known GUID as being a RESTful (e.g.: Redfish™) resource which are managed by the RESTful resource manager 112. In one embodiment UTF-16 character encoding is used in order to be more consistent with UEFI. However, in another embodiment, UTF-8 may be used for either or both the VariableName and the returned data.

In an embodiment, a request for a firmware-managed resource may be submitted using GetVariable. For example, an OS-based entity such as an OS management application or service may submit such a request to read the thermal sensors or the manufacturer name using the syntax described by RedFish. The GetVariable call which is to be handled as a RESTful command may take the following form.

Basic Form:

GetVariable( )==HTTP GET

In this form, the variable name is the URI, the verb is GET and all other fields are defaulted to HTTP/1.1, Content-Type: application/json, Content-Length auto-calculated, From: is default, no authentication. The returned data is formatted UTF-8, first line is the status line, next lines are header response lines. It should be noted that this form is equivalent to the extended form except that GET is not explicitly mentioned.

```
CHAR8 *Content;
UINTN ContentLength;
GetVariable(
    L"/redfish/v1/Systems/1/Actions",
    &gDmtfRedfishGuid,
    NULL,
    &ContentLength,
    (VOID **)&Content);
```

This is translated by the firmware to:

```
GET /redfish/v1/Systems/1/Actions HTTP/1.1
And Content will point to (skipping all standard headers):
    "Actions": {
        "#ComputerSystem.Reset": {
            "target":"/redfish/v1/Systems/1/Actions/ComputerSystem.Reset",
            "ResetType@Redfish.AllowableValues": [
                "On",
                "ForceOff",
                "GracefulRestart",
                "GracefulShutdown",
                "ForceRestart",
                "Nmi",
                "ForceOn",
                "PushPowerButton"
            ]
        }
    }
Status codes of 2xx return EFI_SUCCESS. 404 and 410 return
EFI_NOT_FOUND, 401 and 403 return EFI_ACCESS_DENIED. Others return
EFI_HTTP_ERROR.
```

In an embodiment, a request for a firmware-managed resource may be submitted using SetVariable. For example, an OS-based entity such as an OS management application or service may submit such a request to change a thermal sensor trip point or set the server's asset tag using the RedFish schema. The SetVariable call which is to be handled as a RESTful command may take the following form.

SetVariable( )==HTTP PUT

In this form, the variable name is the URI, the verb is PUT and all the other fields are defaulted. The variable data is the UTF-8 encoded JSON data

```
CHAR16 *Content = L"{ \"ResetType\": \"On\" }";
UINTN ContentLength = StrSize(Content);
SetVariable(
    L"/redfish/v1/Systems/1/Actions/ComputerSystem.Reset",
    &gDmtfRedfishGuid,
    EFI_VARIABLE_RUNTIME_ACCESS,
    ContentLength,
    Content);
```

In an embodiment, the firmware translates this to:

```
POST /redfish/v1/Systems/1/Actions/ComputerSystem.Reset HTTP/1.1
Content-Type: application/json; charset=utf-16
Content-Length: ContentLength
OData-Version: 4.0
Content
    Status codes of 2xx return EFI_SUCCESS. 404 and 410 return
EFI_NOT_FOUND, 401 and 403 return EFI_ACCESS_DENIED. Others return
EFI_HTTP_ERROR.
```

An additional exemplary request for a firmware resource in an embodiment using SetVariable may take the following form in order to delete a resource. A typical example of this from the RedFish specification is to terminate a session by deleting the session number resource.

```
SetVariable( ) (ContentLength = 0) = HTTP DELETE
CHAR16 *Content = NULL;
UINTN ContentLength = 0;
SetVariable(
    L"/redfish/v1/SessionService/Sessions/2(num)",
    &gDmtfRedfishGuid,
    EFI_VARIABLE_RUNTIME_ACCESS,
    ContentLength,
    Content);
```

In an embodiment, the firmware translates this to:
DELETE /redfish/v1/SessionService/Sessions/2(num) HTTP/1.1

In one embodiment PATCH may be used instead of PUT to modify only a part of a resource. For example, SetVariable( ) (Append)=HTTP PATCH /redfish/v1/SessionService {"SessionTimeout": 50} which changes only the SessionService attribute of the resource.

In an embodiment, to return all URIs supported by the system in order to enumerate all of the resources in the system, the request may take the form of:
GetNextVariable( )==HTTP GET from root resource In one embodiment, all extended forms use GetVariable( ) but the variable name is always prefixed by the HTTP verb name (e.g.: GET, PUT, PATCH, DELETE) followed by a space, then the URI and then the HTTP version. Further header lines are allowed as a part of VariableName. As a non-limiting example, in one embodiment the request may take the following form:

```
                CHAR16 *Content =
            UINTN ContentLength = StrSize(Content);
    Get Variable(
    L"POST /redfish/v1/Systems/1/Actions/ComputerSystem.Reset
    HTTP/1.1\r\n"
    L"Content-Type: application/json; charset=utf-16\r\n"
    L"OData-Version: 4.0\r\n"
    L"{\r\n"
    L"\"ResetType\": \"On\"\r\n"
```

```
    L"}",
    &gDmtfRedfishGuid,
    NULL,
    &ContentLength,
    (VOID **)&Content);
```

In an embodiment, the firmware translates this to:

```
POST /redfish/v1/Systems/1/Actions/ComputerSystem.Reset HTTP/1.1
Content-Type: application/json
Content-Length: ContentLength
OData-Version: 4.0
{
"ResetType" : "On"
}
```

Since the exposure of firmware-managed resources to OS-based entities presents additional security risks, embodiments provide a number of techniques to ensure that the user of the OS management application or OS management service has sufficient rights to read and/or write the firmware-managed resources.

In one embodiment, security can be implemented using the standard HTTP BASIC authentication, where the user name and password are encoded in base64 and included in an Extended form VariableName via the Authentication header (as specified in RFC 2617). This type of security authorizes a single action.

In one embodiment, despite RESTful web services usually being stateless, security can be implemented using Redfish (see the Redfish specification, section 9.3.4) sessions, which use a user name and password. This session remains open until the resource is deleted using a DELETE/SetVariable(len=0) or until the default timeout expires.

In an embodiment, changes to data can be implemented using SetVariable( ) with the AUTHENTICATED WRITE or TIME BASED AUTHENTICATED WRITE attributes set. In an additional embodiment, timestamps may accompany a request to change data hashed with a user-name and/or password known to the firmware in order to validate the authority to change data such as by using techniques such as those described in U.S. Pat. No. 9,660,807. This method provides tamper resistance within the OS environment.

In some embodiments, user-name and password can be unique to this resource management interface, use the UEFI User Identification standards (ch. 34), or use an "admin" or "supervisor" user-name, along with the supervisor password.

Figure 3:
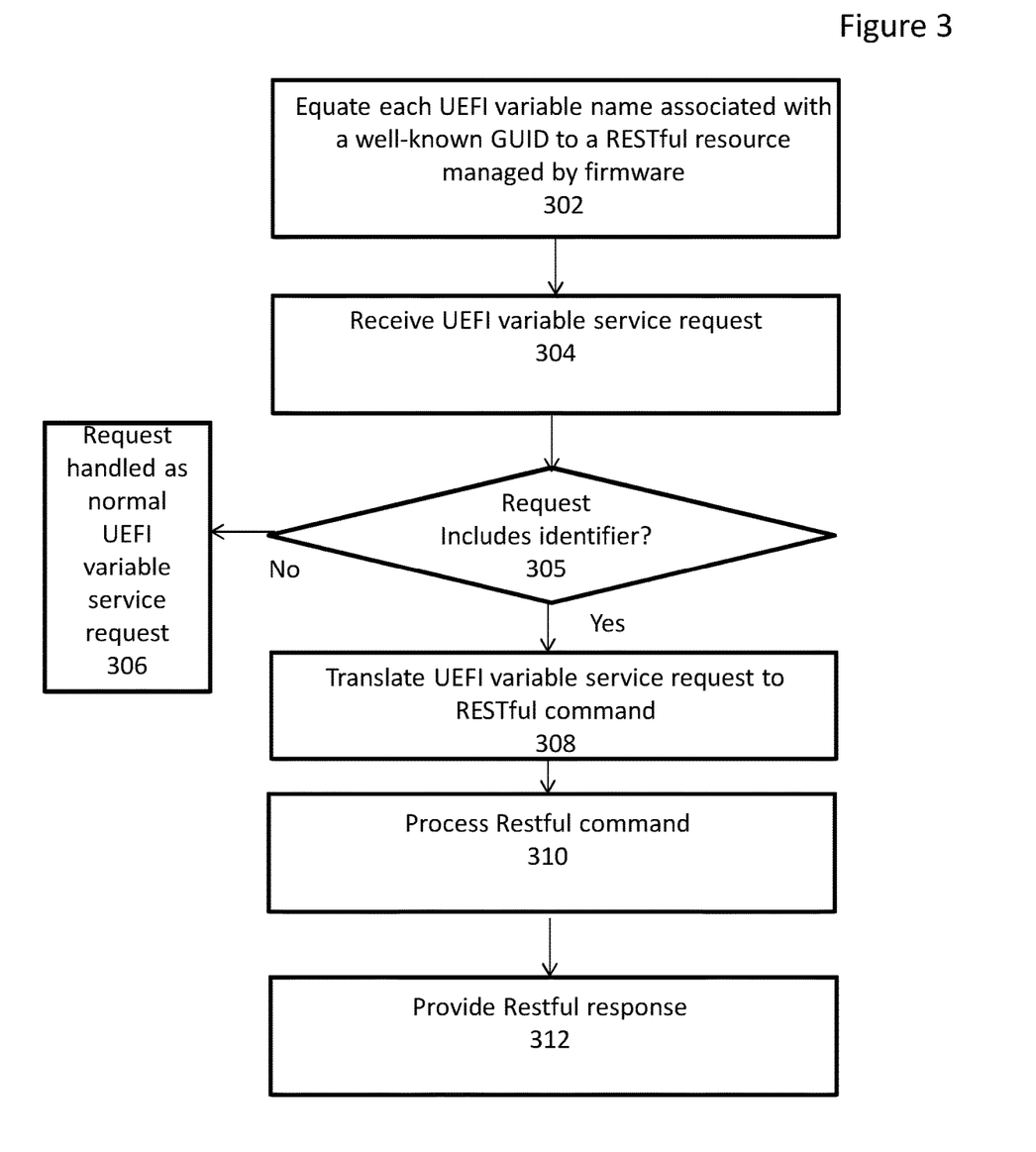

FIG. 3 depicts an exemplary sequence of steps in a computing device to receive RESTful commands for firmware resources in an exemplary embodiment. The sequence begins with the firmware equating each UEFI variable name associated with a well-known GUID to a RESTful resource managed by the firmware (step 302). Using a well-known GUID allows the firmware to distinguish RESTful commands from normal UEFI variables. Using a well-known GUID also allows the firmware to distinguish different domains that may use a similar RESTful syntax but address a different set of resources. For example, one GUID may refer to the firmware acting as a proxy for an on-board BMC while another may refer to resources managed directly by the firmware itself. The use of the UEFI variable names as the URL for the action mimics the existing behavior of the UEFI variable API in a way that is natural, since UEFI variable names are used to uniquely address firmware-managed storage in the UEFI specification. Subsequently the firmware receives a UEFI variable service request from the OS environment via the UEFI runtime interface that includes a UEFI variable name (step 304). In one embodiment, the UEFI variable service request may be accompanied by a pre-defined GUID that identifies the request for special handling as a RESTful command. The firmware translates the request to a RESTful command (step 306). A RESTful resource manager provided by the firmware then processes the RESTful command and provides a RESTful response to the requesting OS-based entity such as, but not limited to an OS management application or OS management service (step 308). The RESTful response may be provided in an industry standard format such as JSON.

Figure 4:
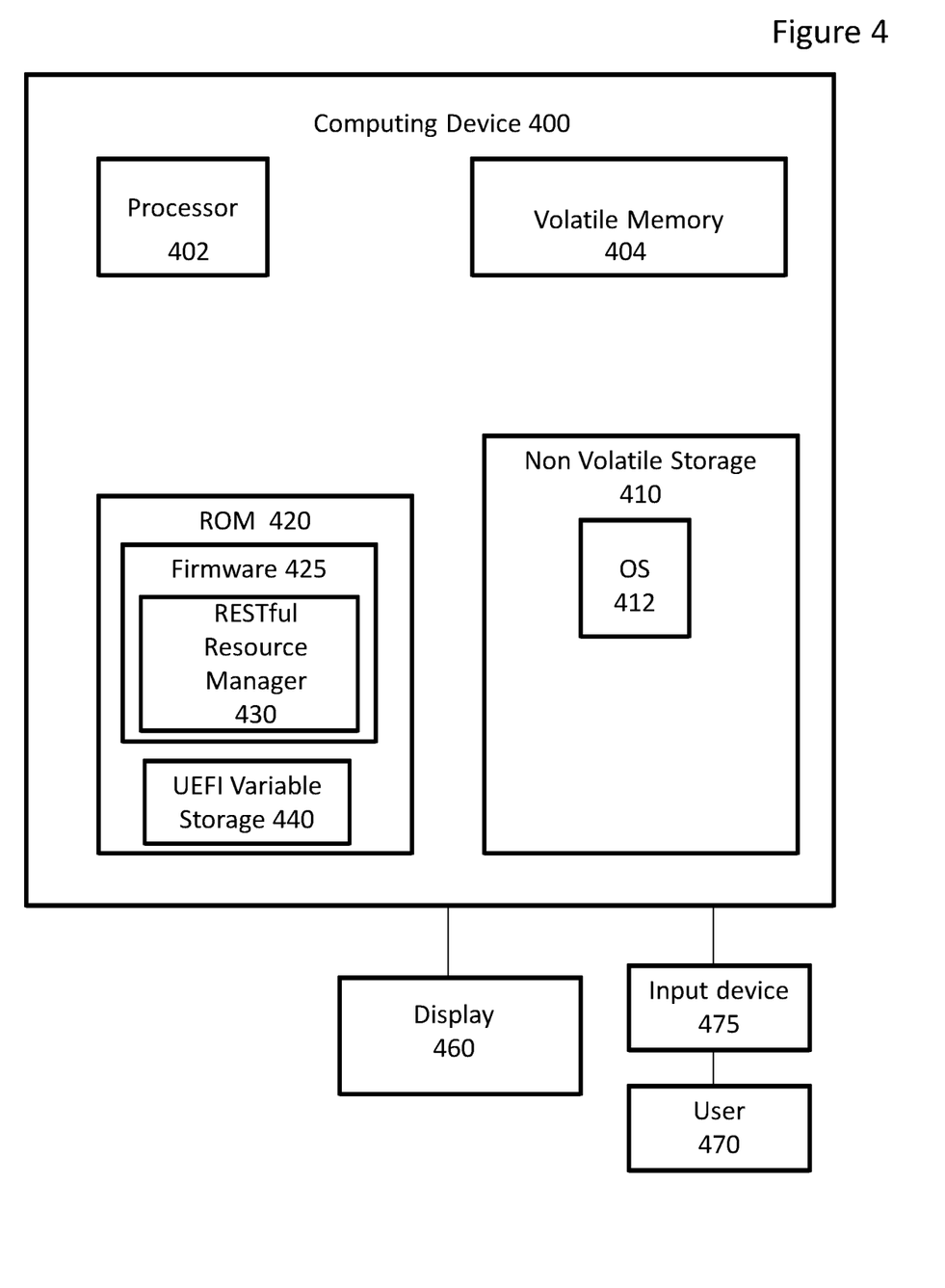

FIG. 4 depicts an exemplary computing environment suitable for practicing an embodiment of the present invention. A computing device 400 includes a processor 402 such as, but not limited to a central processing unit (CPU), and volatile memory such as random access memory (RAM) 404. Computing device 400 may also include non-volatile storage 410 such as a hard drive holding an operating system (OS) 412. The computing device 400 may also include Read Only Memory (ROM) 420 holding device firmware 425. Firmware 425 may be executed during a hoot sequence for the computing platform 400 (as well as at other times) and may load OS 412 into volatile memory 404 for execution during the boot sequence. Firmware 425 may include RESTful resource manager 430. ROM may also include UEFI variable storage 440 holding UEFI variables.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A computing device-implemented method for receiving Representational State Transfer commands (RESTful commands) via firmware on the computing device, comprising:
   equating, for each one of a plurality of Unified Extensible Firmware Interface (UEFI) variable names respectively associated with a well-known Globally Unique Identifier (GUID), the UEFI variable name to a RESTful resource managed by the firmware;
   receiving, with the firmware, a UEFI variable service request from an operating system (OS) entity via a UEFI variable services interface;
   determining whether the UEFI variable service request is accompanied by a pre-defined GUID that identifies the request for special handling as a RESTful command;
   processing the UEFI variable service request as a UEFI variable service request when it is determined that the UEFI variable service request is not accompanied by the pre-defined GUID that identifies the request for special handling as a RESTful command; and
   translating, with the firmware, the UEFI variable service request received via the UEFI variable services interface to a RESTful command for a RESTful resource based on a variable name in the UEFI variable service request when it is determined that the UEFI variable service request is accompanied by the pre-defined GUID that identifies the request for special handling as a RESTful command;
   processing the RESTful command following the translating; and
   providing, via the firmware, a RESTful response based on the processing of the RESTful command.

2. The method of claim 1 wherein the request is received from an operating system management service.

3. The method of claim 1 wherein the request is received from an OS management application.

4. The method of claim 1 wherein the RESTful response is returned in a JavaScript Object Notation (JSON) format.

5. The method of claim 1 wherein a user of the operating system entity is authenticated using HTTP BASIC authentication for a single action.

6. The method of claim 1 wherein a user of the operating system entity is authenticated using a user name and password to establish a session between the operating system entity and the firmware.

7. A computing device, comprising:
   at least one processor;
   an operating system;
   a Unified Extensible Firmware Interface (UEFI) variable services interface; and
   firmware, the firmware when executed causing the computing device to:
      equate, for each one of a plurality of UEFI variable names respectively associated with a well-known Globally Unique Identifier (GUID), the UEFI variable name to a Representational State Transfer resource (RESTful resource) managed by the firmware;
      receive a UEFI variable service request from an operating system entity via a UEFI variable services interface;

determine whether the UEFI variable service request is accompanied by a pre-defined GUID that identifies the request for special handling as a RESTful command;

process the UEFI variable service request as a UEFI variable service request when it is determined that the UEFI variable service request is not accompanied by the pre-defined GUID that identifies the request for special handling as a RESTful command; and translate the UEFI variable service request received via the UEFI variable services interface to a RESTFUL command for a RESTful resource based on a variable name in the UEFI variable service request when it is determined that the UEFI variable service request is accompanied by the pre-defined GUID that identifies the request for special handling as a RESTful command;

process the RESTful command following the translating; and provide a RESTful response based on the processing of the RESTful command.

8. The computing device of claim 7 wherein the request is received from an operating system management service.

9. The computing device of claim 7 wherein the request is received from an OS management application.

10. The computing device of claim 7 wherein the RESTful response is returned in a JavaScript Object Notation (JSON) format.

11. The computing device of claim 7 wherein a user of the operating system entity is authenticated using HTTP BASIC authentication for a single action.

12. The computing device of claim 7 wherein a user of the operating system entity is authenticated using a user name and password to establish a session between the operating system entity and the firmware.

13. A non-transitory medium holding instructions for receiving Representational State Transfer commands (RESTful commands) via firmware on a computing device, the instructions when executed causing the computing device to:

equate, for each one of a plurality of Unified Extensible Firmware Interface (UEFI) variable names respectively associated with a well-known Globally Unique Identifier (GUID), the UEFI variable name to a RESTful resource managed by the firmware;

receive a UEFI variable service request from an operating system entity via a UEFI variable services interface;

determine whether the UEFI variable service request is accompanied by a pre-defined GUID that identifies the request for special handling as a RESTful command;

process the UEFI variable service request as a UEFI variable service request when it is determined that the UEFI variable service request is not accompanied by the pre-defined GUID that identifies the request for special handling as a RESTful command; and translate the UEFI variable service request received via the UEFI variable services interface to a RESTFUL command for a RESTful resource based on a variable name in the UEFI variable service request when it is determined that the UEFI variable service request is accompanied by the pre-defined GUID that identifies the request for special handling as a RESTful command;

process the RESTful command following the translating; and provide a RESTful response based on the processing of the RESTful command.

14. The medium of claim 13 wherein the request is received from an OS management service.

15. The medium of claim 13 wherein the request is received from an OS management application.

16. The medium of claim 13 wherein the RESTful response is returned in a JavaScript Object Notation (JSON) format.

17. The medium of claim 13 wherein a user of the operating system entity is authenticated using HTTP BASIC authentication for a single action.

18. The medium of claim 13 wherein a user of the operating system entity is authenticated using a user name and password to establish a session between the operating system entity and the firmware.

* * * * *